United States Patent Office 2,975,124
Patented Mar. 14, 1961

2,975,124

FLOCCULATION OF FINE PARTICLES BY STARCH ETHERS

Carlyle G. Caldwell, North Plainfield, and Otto B. Wurzburg, Whitehouse Station, N.J., and Shiou-Chuan Sun, State College, Pa., assignors to National Starch and Chemical Corporation, a corporation of Delaware No Drawing. Filed Aug. 28, 1957, Ser. No. 680,889

9 Claims. (Cl. 210—54)

This invention relates to a method for aiding the separation of finely divided particles, such for example as minerals, from aqueous suspension.

The problem of separating fine particles from suspension is encountered in many industries. Thus, in the processing of ores it is frequently the practice to employ a wet grind in order to pulverize the ore and facilitate the freeing of the desired minerals from the matrix. After the required processing, it is necessary that the remaining water either be returned to the process or be disposed of, as by dumping into a stream. However the water at this stage is frequently in the form of a slime, due to the presence of finely divided mineral matter, which cannot be feasibly removed. Our invention is of value in facilitating the removal of such mineral matter, by flocculation, and sedimentation or filtration.

In some cases, besides clarifying the water, the settling or filtering of the fines in the mineral-bearing water is important in order to recover valuable suspended materials, as in operations relating to some ores and coal.

The purification of water supplies is still another reason for removing suspended particles by flocculation.

The problem of clarification of industrial waters is encountered in connection with suspended organic as well as inorganic matter. Thus, in the paper manufacturing industry, after the beaten cellulosic pulp is passed over the "wire" (which is a type of screen) the matted fiber remains on the wire to form the ultimate paper, whereas the water drains off. This water, called "white water" in the paper trade, is then reused in the process or disposed of as an effluent. The substantial amount of suspended cellulosic fiber as well as mineral fillers, pigments, etc., in the water would however interfere with the reuse of the water and would also cause grave pollution problems if dumped. Thus, it is important to devise a means for removing these finely divided inorganic, organic and cellulosic particles.

It has been known that the most desirable means of removing such finely suspended matter is by flocculation, followed by sedimentation and/or filtration. This involves the addition of a small amount of some material which will cause the finely divided solids to "flocculate," that is, to aggregate into larger masses or "flocs," in which condition they are easily removed by filtration or settling. Many materials have been proposed for use as such flocculation additives, but some are characterized by being quite expensive and others are of dubious effectiveness.

Starch, because of its ready availability and low cost, would seem to be an ideal flocculating agent. However, starch in the unmodified state, or modified by means hitherto proposed for use in flocculation, is not sufficiently effective to solve many of the industrial problems.

We have now discovered that finely divided matter may be efficiently and economically flocculated from water by the use of a particular chemical derivative of starch. The derivative which we have found to be of particular value as a flocculating additive is the tertiary amino alkyl ether of starch or the quaternary derivative of this product. The tertiary amino alkyl ether may be diagrammatically represented as follows:

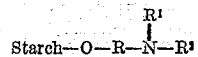

where R is a radical selected from the group consisting of alkyl and hydroxyalkyl radicals, and each of $R^1$ and $R^2$ is a radical selected from the group consisting of alkyl, aryl and aralkyl radicals. The quaternary derivatives would then become

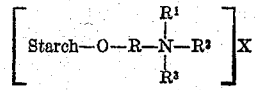

wherein R, $R^1$ and $R^2$ represent the radicals indicated above, and where $R^3$ is an alkyl group, preferably methyl or ethyl, and X may be a halogen or a hydroxyl group (depending upon whether the derivative is in the form of the salt or the base).

Tertiary amino alkyl starch ethers may be made by the etherification of starch, preferably in an alkaline medium, with etherification reagents capable of introducing tertiary amino groups, such for example as the dialkyl amino alkyl halides and the dialkyl amino alkyl epoxides, or their salts. We particularly prefer the b-dialkyl amino alkyl halides. Representative examples of reagents include b-diethyl amino ethyl chloride; b-dimethyl amino isopropyl chloride; b-dimethyl amino ethyl chloride; 3-dibutyl amino 1,2 epoxypropane; 2-bromo-5-diethyl amino pentane hydrobromide; N-(2,3 epoxypropyl) piperidine; N-(2,3 epoxypropyl) methyl aniline. The various halides (e.g., chloro-, bromo- etc.) can of course be used inter changeably. In place of the free amines (e.g., b-diethyl amino ethyl chloride) it is often found preferable to use the corresponding hydrochloride or other salts of these reagents (e.g., hydrochloride, hydrosulfate, nitrate, acetate). Thus, for example we might use b-diethyl amino ethyl chloride hydrochloride. It is to be understood that when we refer to the use of the tertiary alkyl amine etherification reagents we include in that term the salts of those reagents. The hydrochloride (or other salt) moiety takes no active part in the etherification reaction.

A method for the production of tertiary amino alkyl ethers of starch, by the treatment of starch, in an alkaline medium, with the above reagents (and if desired forming the quaternary salts of the thus-obtained starch ethers) is described in copending application Serial No. 360,818, filed June 10, 1953, and now U.S. Patent No. 2,813,093 assigned to the assignees of the present application.

It will be noted that we prefer the tertiary and quaternary amino alkyl ethers of starch, for the purposes of this invention, since we have found, surprisingly, that the primary and secondary amino alkyl ethers are not effective.

By "starch" we include starch derived from any source, including corn, waxy maize, tapioca, potato, wheat, rice and sago. All of these are effective flocculating agents (in the form of their tertiary or quaternary amino alkyl ethers), but we have found that the tuber starches (i.e., potato, tapioca) are even more efficient in many cases than the grain starches, and we therefore prefer the former. The starch, at the time of etherification to produce the amino alkyl derivative, may be in the raw, undegraded state, or it may have been degraded by oxidation, acid-treatment or heat to a so-called thin-boiling or fluidity form. Other chemical treatments of the starch, either prior to, concurrently with, or subsequent to the etherification, are permissible, so long as the final product is still amylaceous and contains the tertiary or quaternary amino alkyl substituent groups.

The application of our product to flocculation procedures is simple, involving merely the addition of an appropriate amount of the starch derivative (usually in the form of a dilute sol) to the fluid containing the suspended solids. Since one is dealing here with industrial procedures which are so diverse (albeit all employing the same concept of flocculation), including recovery of suspended mineral or coal particles, removal of unwanted suspended particles, and clarification of industrial waters for reuse or other disposition, among others, it is seen that no one specific series of steps, proportion and materials can be set forth, other than by way of illustration.

It is well known that starch exists naturally in the form of discrete granules which, when mixed with cold water, do not disperse but rather settle to the bottom. When an aqueous suspension of such granules is heated, or mixed with sufficient caustic or other suitable chemical, the starch granules go through a process known as gelatinization. This involves the swelling, disintegration and dispersal of the granules to form a hydrated colloidal dispersion. It is in the form of this gelatinized state, or hydrated dispersion, that our starch derivatives are effective as flocculants.

The amino alkyl starch ethers themselves may be produced in ungelatinized or gelatinized form, as desired. If ungelatinized, the starch ether may first be cooked in water, or mixed with aqueous alkali or other known gelatinizing agent, so as to form a gelatinized dispersion of the derivative, which is then added to the fluid requiring flocculation. Or, if convenient, the ungelatinized starch may be added directly to the fluid requiring flocculation, and sufficient alkali added or heat applied to gelatinize the starch in situ.

Alternatively, the amino alkyl starch ether may be produced directly in gelatinized form. This occurs when sufficient heat or alkali is present during the original etherification reaction so as to gelatinize the starch. In such cases the original reaction mass containing the gelatinized amino alkyl starch ether may be added directly to the fluid requiring flocculation.

By still another modification, the starch ether may be used in dry, cold water soluble form. This form is achieved by taking an aqueous dispersion of the gelatinized starch ether (resulting from the original etherification reaction, or from heating an ungelatinized starch ether in water) and passing over heated drums or other suitable drying means, so as to produce a dry product which may then be dispersed by mere mixing with cold water. Even a suspension of an ungelatinized starch ether may be made cold water soluble by passing over drums heated sufficiently so as to simultaneously gelatinize and dry the product. The advantage of using an amino, alkyl starch ether in dry, cold water soluble form is that its dispersions may be readily prepared by adding to cold water.

It should be noted that when we speak of the tertiary or quaternary amino alkyl ethers of starch, we do not include in that class those starch derivatives which have been so highly substituted as to have lost their essential starch characteristics. The derivatives employed in our invention are still essentially starches, both by visual examination and in their possession of the general chemical and physical structure of starch. In general we use amino alkyl starch ethers wherein the starch has a degree of substitution within the range 1 substituent group per 10 anhydroglucose units to one substituent group per 200 anhydroglucose units. Within this area, we prefer to employ starch derivatives with a degree of substitution within the range 1 substituent group per 20 anhydroglucose units to 1 substituent group per 60 anhydroglucose units.

The amount of the above-described starch ether to be used in the flocculation process will necessarily vary with the particular industrial application involved, the type and quantity of material to be flocculated, and other obvious variables. In general we have found it advisable to employ at least one part of the starch derivative per million of suspended solids (dry weight basis). There is no critical upper limit, although one would not ordinarily employ more of the starch derivative than is required to flocculate the desired amount of solids.

*Example I*

This example illustrates the superior effectiveness of an amino-alkylated potato starch, as against an untreated potato starch, in flocculating marl, a cement bearing lake shale.

An aqueous suspension of marl, containing 4.5% solids by weight, was poured into a series of six 100 ml. graduated cylinders. One was used as a control. To the five other cylinders we added 1 ml. (222 p.p.m. on solids) increments of a gelatinized potato starch dispersion prepared by slurrying one gram of potato starch in water, peptizing by adding a 10% aqueous solution of NaOH, and then diluting to 1000 ml. total. No flocculation of the suspended solids was noted until 5 ml. (1110 p.p.m. on solids) of this potato starch solution had been added.

To the control cylinder we then added only 1 ml. (222 p.p.m. on solids) aqueous dispersion of a potato starch derivative containing 1 diethyl amino ethyl hydrochloride group per 29 anhydroglucose units, and having a solids concentration equal to that of the causticized potato starch dispersion used above. Flocculation occurred immediately, the suspended solids settling rapidly. The addition of 0.1 ml. (555 p.p.m. on solids) of a 2½% aqueous solution of aluminum sulfate increased the effectiveness of the aminoalkylated potato starch derivative even further.

*Example II*

In this example, untreated potato starch and amino-alkylated corn starch were compared as flocculating agents for zircon. It should be noted that untreated potato starch has heretofore been considered one of the more effective of the starches, for flocculation.

Zircon was ground for seven hours, screened through a 200 mesh sieve, and 40 gram portions were then slurried in 500 ml. of water for 5 minutes, and allowed to soak for 12 hours. The thoroughly wetted mineral slurry was then agitated for 5 minutes, poured into standardized 1 liter graduated glass cylinders, and diluted to 1000 ml. with water and a predetermined amount of flocculant solution. The cylinders were then turned for 10 complete end-over-end cycles, and the settling rate of the mineral particles determined (the median particle size was 1.198 micron; the range of size was 0.4 to 10 microns).

When the slurry is put in the cylinder it is of course a relatively cloudy to opaque suspension. As it stands, and the solids form floccules and sink toward the bottom, a portion of the liquid in the top portion of the cylinder (the supernate) becomes clear. There is a clearly discernible line of demarcation between the upper, clear portion and the lower, cloudy portion. The settling rate for any given cylinder was determined by noting the time taken for the line of demarcation between the two phases to reach a point 25 ml. below the top of the fluid column, this figure being computed in terms of mls. per hour. Obviously, the greater the distance the cloudy portion sinks in a given time (that is, the speedier the rate of settling), the more efficient is the flocculant employed.

In the following table we show the settling rates of the mineral particles in slurries containing, respectively, no flocculant, a flocculant consisting of 30 mg. of untreated cooked potato starch per liter of slurry, and a flocculant consisting of 30 mg. of cooked diethylamino ethyl ether of corn starch per liter of slurry (the starch ether containing 1 substituent group per 44 anhydroglucose units). The settling rate is noted, at various pH levels, and the remarkable efficiency of the aminoethyl starch is obvious.

| Flocculant (0.075% by wt., or 750 p.p.m. on solids in slurry, except in (1)) | pH of slurry | Settling rate, expressed as ml./hour |
|---|---|---|
| (1) None | 5.6 | 25 |
| | 7.2 | 25 |
| | 9.5 | 25 |
| | 11.5 | 470 |
| (2) Untreated potato starch | 6.3 | 25 |
| | 7.5 | 25 |
| | 10.2 | 35 |
| (3) Diethylamino ethyl ether of corn starch | 5.6 | 2,000 |
| | 7.3 | 2,800 |
| | 9.3 | 2,700 |
| | 11.7 | 2,600 |

*Example III*

The procedure of Example II was repeated, except that in place of the zircon we tested a suspension of wolframite (from Montoro, Spain), ground to pass through a 325 mesh sieve. All of the other materials, proportions and procedures were identical with those described in Example II. The settling rates are noted below:

| Flocculant (0.075% by wt., or 750 p.p.m. on solids in slurry, except in (1)) | pH of slurry | Settling rate, expressed as ml./hour |
|---|---|---|
| (1) None | 6.8 | 25 |
| | 8.4 | 25 |
| | 11.7 | 75 |
| (2) Untreated potato starch | 6.0 | 1,900 |
| | 8.0 | 1,400 |
| | 10.0 | 750 |
| (3) Diethylamino ethyl ether of cornstarch | 6.5 | 2,400 |
| | 8.4 | 3,600 |
| | 11.7 | 3,000 |

It is seen that whereas untreated potato starch is indicated to be more effective on wolframite ore than on zircon, the diethylamino ethyl ether of starch is nevertheless superior in both cases.

*Example IV*

In this example, a number of other mineral materials were tested, in the manner described in Example II, comparing the rates of settling achieved with and without the tertiary amine starch. Chromite, barite, galena and quartz, respectively, were made into slimes (i.e., aqueous slurries), following the procedure described in Example II. Settling tests were run, with and without the starch derivative as flocculant, the results being listed below:

| Mineral material (4.0% solids slurry) | Flocculant (0.075% by wt., or 750 p.p.m. on dry material) | pH of slurry | Settling rate, mls./hour |
|---|---|---|---|
| Chromite | None | 6.8 | 80 |
| | | 7.9 | 90 |
| | | 9.8 | 100 |
| | Diethylamino ethyl ether of corn starch | 6.8 | 710 |
| | | 8.2 | 740 |
| | | 9.7 | 800 |
| Barite | None | 6.4 | 675 |
| | | 7.7 | 675 |
| | | 9.7 | 725 |
| | Diethylamino ethyl ether of corn starch | 6.5 | 1,850 |
| | | 7.8 | 1,940 |
| | | 9.9 | 2,250 |
| Galena | None | 6.3 | 2,500 |
| | | 7.0 | 3,300 |
| | Diethylamino ethyl ether of corn starch | 6.3 | 4,250 |
| | | 7.0 | 5,250 |
| Quartz | None | 6.6 | 10 |
| | | 7.7 | 10 |
| | | 9.7 | 10 |
| | Diethylamino ethyl ether of corn starch | 6.5 | 71 |
| | | 8.1 | 43 |
| | | 9.8 | 36 |

*Example V*

In this example, we compared the effectiveness of tertiary aminoalkyl starch ethers of various degrees of substitution, as well as a quaternary derivative, as against the corresponding untreated potato, waxy maize, corn and tapioca starches. Also compared are an "acid fluidity" corn starch as against an "acid fluidity" corn starch which had been etherified with a tertiary aminoalkylating agent. "Acid fluidity" is a term generally used in the starch industry and elsewhere to denote a starch which has been acid-converted so as to cause it to produce thinner dispersions when gelatinized in water.

The quaternary amine derivative of potato starch, referred to in the following table, was, in this specific case, the bromide salt of the N-methyl-N,N diethylaminoethyl ether of potato starch. It had approximately one such substituent grouping per 30 anhydroglucose units of the starch, and was made by suspending 20 parts of the diethyl amino ethyl ether of potato starch, having that same degree of substitution, in 100 parts ethanol containing 10 parts of methyl bromide. The suspension was heated at reflux for 2 hours, allowed to cool, and the starch filtered and dried under vacuum.

When we refer to a "tertiary amine derivative 1:30" we mean one which is substituted to the extent of approximately 1 diethylaminoethyl ether group per 30 anhydroglucose units. Similarly "1:200" and "1:10" refer to starch ethers containing, respectively, 1 substituent group per 200 anhydroglucose units and 1 substituent group per 10 anhydroglucose units.

The mineral tested in this example was titanium dioxide. An aqueous suspension of titanium dioxide containing 3% solids was ground in a ball mill for 16 hours, and poured into a series of 1-liter graduated, standardized cylinders. Aqueous dispersions of various flocculants, containing 0.625 grams (dry basis) per liter were introduced into the cylinders, in a quantity equivalent to 333 parts per million of dry flocculant, based on the mineral solids of the suspension. The cylinders were then inverted end-over-end, three times. The time required for the clear, upper portion of the fluid to extend down to the 800 ml. mark was noted. This is the "Settling Time in Seconds."

After one hour we also determined the percent light transmittance (%T) of the supernatant liquid. This is of course a measure of the clarity of the liquid, and therefore of the effectiveness with which suspended solids have been removed. This measure was taken on a "Spectronic 20 Colorimeter," manufactured by the Bausch & Lomb Optical Co., Rochester, N.Y., using a 1 cm. light path.

After standing overnight, the floc volume in each cylinder was also measured, in milliliters. Increasing floc volume indicates a decreasing density in the settled sludge; a well flocculated material contains larger aggregates which cannot settle as densely as unflocculated material.

Summarizing, therefore, improved efficiency in flocculation is indicated by reduction in settling time, and by increase in ligh transmittance and floc volume. In some cases, in the following table, it will be seen that even where a significant improvement is not apparent in settling time, there will be a substantial improvement in light transmittance of the supernate, indicating improved removal of suspended particles.

| Flocculant (333 p.p.m. on TiO$_2$ solids) | Settling time (Seconds) | Percent T | Floc volume (ml.) |
|---|---|---|---|
| None | 83 | 20.0 | 95 |
| Potato starch (untreated) | 45 | 72.0 | 105 |
| Tertiary amine ether of potato starch 1:30 | 44 | 94.0 | 120 |
| Quaternary amine derivative of potato starch 1:30 | 45 | 95.5 | 118 |
| Waxy maize starch (untreated) | 62 | 77.0 | 100 |
| Tertiary amine ether of waxy maize 1:30 | 54 | 93.0 | 105 |
| Acid fluidity corn starch | 59 | 79.0 | 100 |
| Tertiary amine ether of acid fluidity corn starch 1:30 | 52 | 92.0 | 110 |
| Tapioca starch (untreated) | 59 | 78.5 | 105 |
| Tertiary amine ether of tapioca starch 1:30 | 52 | 91.0 | 110 |
| Tertiary amine ether of potato starch 1:200 | 47 | 92.5 | 119 |
| Tertiary amine ether of potato starch 1:10 | 49 | 96.0 | 118 |
| Corn starch (untreated) | 82 | 20.0 | 95 |
| Tertiary amine ether of corn starch 1:200 | 60 | 72.5 | 97 |
| Tertiary amine ether of corn starch 1:10 | 69 | 77.0 | 100 |

*Example VI*

Bituminous coal was suspended in water, to the extent of 3% solids concentration, and allowed to soak for 72 hours. It was then poured into a series of 1-liter graduated cylinders and thereafter treated as described in Example V. The light transmittance of the supernate was checked in each case ½ hour after the addition of the flocculant. The test results, using various flocculants, are indicated below:

| Flocculant | P.p.m. of flocculant on dry solids | Percent transmittance of supernate |
|---|---|---|
| None | | 0 |
| Potato starch (untreated) | 333-6660 | 2-5 |
| Tertiary amine ether of potato starch 1:30 | 333 | 70.5 |
| Quaternary amine derivative of potato starch 1:30 | 333 | 71.5 |
| Tertiary amine ether of potato starch 1:100 | 333 | 68.0 |
| Tertiary amine ether of potato starch 1:10 | 333 | 80.0 |
| Waxy maize starch (untreated) | 333-6660 | 0 |
| Tertiary amine ether of waxy maize starch 1:30 | 333 | 37.0 |
| Acid fluidity corn starch | 333-6660 | 0 |
| Tertiary amine ether of acid fluidity corn starch 1:30 | 333 | 33.0 |
| Tapioca starch (untreated) | 333-6660 | 0 |
| Tertiary amine ether of tapioca starch 1:30 | 333 | 75.0 |
| Corn starch | 333-6660 | 0 |
| Tertiary amine ether of corn starch 1:100 | 333 | 32.5 |
| Tertiary amine ether of corn starch 1:10 | 333 | 41.0 |
| Tertiary amine ether of potato starch 1:30, plus alum | { $^1$333 $^2$333 } | 95.5 |

$^1$ Starch.
$^2$ Alum.

*Example VII*

In this example we tested an aqueous suspension resulting from the processing of ilmenite-rutile, and containing approximately 1.2% solids, mainly in the form of quartz and silica. The suspension was poured into 1-liter graduated cylinders and treated, respectively, with solutions containing 1.25 grams per liter of potato starch, causticized potato starch and a potato starch derivative containing approximately one diethylaminoethyl ether group per 30 anhydroglucose units. The time required for settling of the solids was noted, as well as the percent light transmittance of the supernate. As will be seen from the following figures, the tertiary amine derivative was as much better flocculant than either the untreated or causticized potato starch. The addition of alum increased the effectiveness of the aminoalkyl derivative still further.

| Flocculant | P.p.m. on solids | Settling time | Percent light transmittance of supernate |
|---|---|---|---|
| Potato starch | 930-18,600 | No settling | 2.0 |
| Causticized potato starch | 930-18,600 | do | 2.0 |
| Tertiary amine ether of potato starch | 930 | 35 seconds | 75.5 |
| Tertiary amino ether of potato starch plus alum | { $^1$930 $^2$930 } | 40 seconds | 95.0 |

$^1$ Starch.
$^2$ Alum.

*Example VIII*

It is sometimes desirable to suspend clay or other mineral matter in water, for purposes of purification, intra-plant handling, and the like, and subsequently to remove it from suspension by flocculation. This example illustrates the efficiency of the tertiary amine starch derivative for such flocculation.

100 parts of German ball clay were mixed with 95 parts water and 0.8 parts of sodium lignosulfonate (a dispersant). The mixture was ground in a ball mill for 72 hours, then passed through a 325 mesh screen. The material passing through the screen, having a solids content of 3.8%, was transfered to a series of 52 inch long cylinders (inside diameter 2¼ inches). Solutions of flocculant were added, as indicated below, the cylinders inverted six times, and the mixture allowed to settle.

The tertiary amine potato starch derivative used was one which contained approximately one diethylaminoethyl ether group per 30 anhydroglucose units. It will be noted that this derivative flocculated the clay very much more rapidly than either the untreated or causticized potato starch.

| Flocculant | Parts per million on solids | Settling rate (Feet per hour) |
|---|---|---|
| None | 0 | |
| Cooked potato starch | 1,250 | |
| Do | 5,000 | |
| Do | 10,000 | |
| Causticized potato starch pH 12 | 1,250 | 0.18 |
| Do | 5,000 | 0.22 |
| Do | 10,000 | 0.28 |
| Tertiary amino potato starch | 1,250 | 4.61 |
| Do | 5,000 | 5.11 |
| Do | 10,000 | 6.42 |

*Example IX*

This example illustrates the use of the flocculant of our invention for removing suspended matter from the white water of paper mills. White water is a term used by paper mills generally to describe all waters of the paper making process which have been separated from the cellulosic stock and pulp suspensions. White water usually contains a certain amount of fiber, and may also contain varying amounts of fillers, pigments, dyestuffs etc. Before reusing the waters, or discharging them as effluents, it is desirable and often indeed absolutely necessary, that a good part of the suspended solids be removed.

Potato starch was cooked in water at 90–100° C. for 20 minutes (1 gram starch in 200 ml. water). Similarly, a tertiary amino potato starch derivative containing approximately 1 substituent group per 30 anhydroglucose units was cooked in the same proportions. Animal glue was also dispersed in water, in these same proportions.

To the white water, in 1 liter standardized graduated cylinders, we added the above solutions, in the proportion of 0.15% flocculent, dry weight basis, on the weight of the white water. The cylinders were inverted four times, and the time taken for the flocculated solids to settle to the 300 ml. mark was noted. Obviously, the shorter the period required for settling, the more efficient the flocculant.

| Flocculant | Subsidence time, to 300 ml. mark in seconds |
|---|---|
| None | 1,000 |
| Animal glue | 610 |
| Potato starch | 680 |
| Tertiary amine derivative of potato starch | 300 |

*Example X*

This example illustrates the flocculation of Attapulgite clay and of a Florida phosphate, comparing as flocculants untreated corn starch, a primary amine derivative of corn starch and a tertiary amine derivative of corn starch. The primary amine derivative resulted from the reaction of corn starch with ethylenimine, and contained approximately 1 substituent group per 18 anhydroglucose units. The tertiary amine derivative resulted from the reaction of corn starch with beta-diethyl amino ethyl chloride hydrochloride, and also contained one substituent group per 18 anhydroglucose units. Each of these starches were dispersed in water by cooking 1 gram of the starch in 250 ml. water for 20 minutes, at 90–100° C. These solutions were added (1) to a 3% aqueous dispersion of Attapulgite clay and (2) to a Florida phosphate slime containing 5% solids. The amount of flocculant in all cases was 40 parts per million on the total slime, or 1333 p.p.m. on clay solids and 800 p.p.m. on phosphate slime solids. Turbidity decreases (indicative of settling of solids) were measured as percent light transmittance through a 1 centimeter cell in a Bausch & Lomb Spectrometer, as described in Example V, after ½ hour settling time.

| Flocculant | Suspension | Settling rate, feet per hour | Percent light transmittance |
|---|---|---|---|
| Untreated corn starch | Clay | 0 | 0 |
|  | Phosphate | 9.6 | 24 |
| Primary amine derivative of corn starch | Clay | 11.7 | 0 |
|  | Phosphate | 5.7 | 15.5 |
| Tertiary amine derivative of corn starch | Clay | 22.4 | 79.0 |
|  | Phosphate | 14.7 | 86.0 |

It is seen that the tertiary amine derivative of corn starch is very much more effective than either untreated corn starch or the primary amine derivative of corn starch, as a flocculant for clay or phosphate.

*Example XI*

In this example we illustrate the flocculation of Florida phosphate slime, indicating the effectiveness of various types of tertiary alkyl amino starches.

Florida phosphate slime (5% solids) was placed in a series of 52 inch long, 2¼ inch diameter glass cylinders. Separately various amino alkyl ethers of potato starch were dispersed in water, and added to the cylinders in an amount equivalent to 40 parts per million of the starch derivative (dry basis) based on the slime, or 800 p.p.m. on dry solids. In each case the starch derivative was one which contained approximately one substituent group per 30 anhydroglucose units. In one cylinder, no flocculant was added, and in another the flocculant was a dispersion of untreated potato starch.

The settling rate was determined, and computed in terms of feet per hour. The clarity of the supernate was measured in terms of percent light transmittance through a 1 cm. light path on a Bausch & Lomb "Spectronic 20" colorimeter. Samples for these readings were taken at a point six inches below the surface of the supernate liquid 10 minutes after addition of the flocculant. Results are summarized below:

| Flocculant | Settling rate (ft./hr.) | Percent light transmittance |
|---|---|---|
| None | 23.0 | 13.0 |
| Untreated potato starch | 25.6 | 13.5 |
| Diethyl amino ethyl ether of potato starch | 75.1 | 75.0 |
| Dimethyl amino ethyl ether of potato starch | 36.8 | 71.0 |
| Diisopropyl amino ethyl ether of potato starch | 35.8 | 79.0 |
| Dimethyl amino isopropyl ether of potato starch | 29.0 | 43.0 |

It is seen that, whereas the various dialkyl amino alkyl ethers of starch appear to vary in their efficiency as flocculants, they all show a measurable improvement over the untreated starch, either in terms of settling rate or light transmittance, or both.

*Example XII*

This example illustrates the effectiveness of the tertiary amino alkyl ether even when used in very small proportions.

500 ml. of finely ground gold ore pulp (23% solids, pH 10.23) were put into a series of beakers and stirred at 10 r.p.m. in a multiple head stirrer. Flocculant solutions of a cold water soluble potato starch and of a tertiary amine ether of potato starch containing 1 substituent group per 30 anhydroglucose units were prepared by dissolving 0.05 gms. starch in 1000 ml. water. 2 ml. of the flocculant solution (equivalent to 0.87 parts per million on solids) was added to the ore pulp, while stirring at 100 r.p.m. for one minute.

The stirrer was then slowed to 10 r.p.m. and the settling or subsidence time to the 300 ml. mark was noted. Clarities (percent light transmittance) were measured, in the manner already described, after 15 minutes; samples were taken ½" from the top.

| Flocculant | Seconds to 300 ml. | Percent light transmittance |
|---|---|---|
| None | 485 | 20.0 |
| Potato starch | 460 | 19.0 |
| Tertiary amine ether of potato starch | 375 | 51.5 |

*Example XIII*

In a variation of the preceding example, 500 ml. of a 3% aqueous suspension of Attasorb clay were placed in beakers and stirred with a multiple head stirrer. Flocculant solutions were prepared, and evaluated as described in Example XII. The flocculants were added in the proportion of 132 parts per million on the suspended solids.

| Flocculant | Seconds to 300 ml. | Percent light transmittance after reaching 300 ml. |
|---|---|---|
| None | 1,310 | 3.0 |
| Potato starch | 1,210 | 6.0 |
| Tertiary amine ether of potato starch | 250 | 38.5 |

Example XIV

Paper mill white water at a pH of 4.4 and containing 0.2% suspended solids was placed in a series of 1 liter graduated cylinders. Flocculant solutions were prepared by dissolving 0.5 gms. of dry flocculant in 1 liter of water. The dosage of flocculant was 0.5 p.p.m. on the white water (in the case of paper mill white water, we do not usually express dosage in parts per million parts of solids, because of the extremely dilute nature of white water). Clarification (subsidence of suspended solids) was observed visually; results are summarized below:

| Flocculant | Subsidence | Supernate clarity |
|---|---|---|
| None | None | Very cloudy. |
| Potato starch | Very slight | Do. |
| Synthetic flocculant | Slight | Cloudy. |
| Tertiary amine derivative of potato starch (1:30) | Rapid | Almost clear. |

Another sample of white water from a different mill was obtained and treated as described above. This white water contained 0.5% suspended solids and had a pH of 6.2. Flocculant solutions were prepared by dissolving 5.0 grams of dry flocculant in 1 liter of water. Dosage was 10 p.p.m. on the white water; results are summarized below:

| Flocculant | Subsidence | Supernate clarity |
|---|---|---|
| None | None | Very cloudy. |
| Potato starch | Slight | Cloudy. |
| Synthetic flocculant | Rapid | Slightly cloudy. |
| Tertiary amine derivative of potato starch. | Very rapid | Almost clear. |
| Synthetic flocculant+10 p.p.m. alum. | Rapid | Clear. |
| Tertiary amine derivative of potato (1:30)+10 p.p.m. alum. | Very rapid | Crystal clear. |

Among the various tertiary amino alkyl ethers of starch, we have found that the most effective as flocculants appear to be the beta-dialkyl amino alkyl ethers, and we therefore prefer this class. Within that class, we have obtained the best results, as a flocculating agent, with the beta-diethyl amino ethyl ether of starch.

Depending upon convenience, availability of materials, and the circumstances of the particular process involved, the practitioner in the art will find it possible to make many variations in the materials, proportions and procedures herein described, without departing from the scope of this invention, which is limited only by the following claims.

We claim:
1. In the method for separating finely divided solid substances from aqueous suspension by the addition of a flocculating agent to said suspension to accelerate the settling of said substances, the step which comprises using as such flocculating agent a substance selected from the class consisting of the water-dispersible tertiary amino alkyl ethers of starch and their water-dispersible quaternary derivatives.
2. The method of claim 1, in which the flocculating agent is a beta di-dialkyl amino alkyl ether of starch.
3. The method of claim 2, in which the flocculating agent is a beta-diethyl amino ethyl ether of starch.
4. The method of claim 1, in which the starch is a root starch.
5. The method of claim 1, in which the tertiary amino alkyl ether of starch is one which contains from 1 substituent group per 10 anhydroglucose units to 1 substituent group per 200 anhydroglucose units.
6. The method of claim 1, in which the flocculating agent is present in the amount of at least 1 part per million of solids, by weight, in the suspension.
7. The method of claim 1, in which the solid substances to be separated from the suspension are inorganic.
8. The method of claim 1, in which the solid substances to be separated from the suspension are organic.
9. The method of claim 1, in which the starch is added to the suspension in the form of a gelatinized aqueous dispersion.

References Cited in the file of this patent

UNITED STATES PATENTS

| 2,264,448 | Moller | Dec. 2, 1941 |
| 2,728,724 | Gloor | Dec. 27, 1955 |
| 2,728,725 | Gloor | Dec. 27, 1955 |
| 2,813,093 | Caldwell et al. | Nov. 12, 1957 |
| 2,876,217 | Paschall | Mar. 3, 1959 |

FOREIGN PATENTS

| 154,799 | Australia | Jan. 14, 1954 |

OTHER REFERENCES

Schweitzer: "Rubber Chemistry and Technology," vol. 13, pages 408–414 (1940).